3,112,842
PRESSURE VESSEL CLOSURE
Alexander I. Perl, Flushing, N.Y., assignor to Foster Wheeler Corporation, New York, N.Y., a corporation of New York
Filed July 16, 1962, Ser. No. 209,881
7 Claims. (Cl. 220—46)

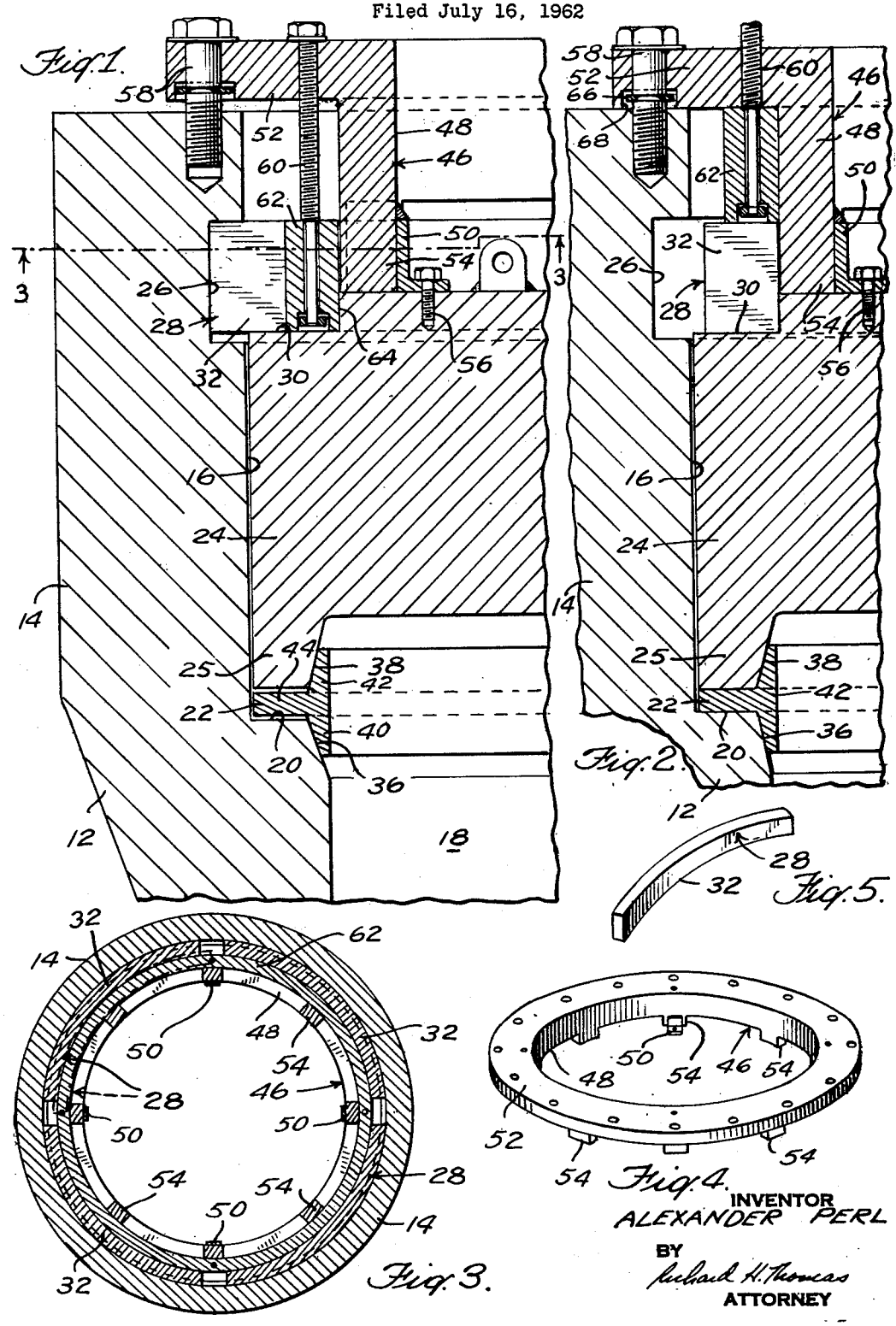
Dec. 3, 1963     A. I. PERL     3,112,842
PRESSURE VESSEL CLOSURE
Filed July 16, 1962
INVENTOR
ALEXANDER PERL
BY
Richard H. Thomas
ATTORNEY United States Patent Office — 3,112,842 — Patented Dec. 3, 1963

This invention relates to a closure arrangement for a pressure vessel, and in particular to an arrangement by which an elastic gasket for the closure is precompressed prior to securing the closure in the vessel opening.

Certain industrial processes today are requiring larger and heavier walled vessels capable of withstanding increasingly greater internal pressures. In addition, these vessels are provided with large diameter openings, and it is an object of the invention to provide a simplified, easily used, closure arrangement which is capable of being employed for vessel openings of 30 inches in diameter or more under an internal pressure of 5,000 to 10,000 pounds per square inch, or more.

In conventional closure arrangements, it has been proposed to use a shear ring assembly to hold the closure within the vessel opening against internal pressures within the vessel. This is accomplished by positioning the shear ring in a recessed area in the vessel opening wall outside of the closure so that the outer surface of the closure bears against the ring. Although the closure can be dimensioned with sufficient clearance so that the ring can be inserted in the recessed area, after the closure is inserted in the opening, provision then must be made for sealing the closure when the latter moves outwardly to bear against the shear ring. Resilient gaskets are known which can be used for this purpose, but then the problem of precompressing the gasket for insertion of the shear ring is presented. In order to handle the high, internal, vessel pressures, these gaskets are made of steel or some similar elastic but fairly rigid material.

Towards this purpose and in accordance with the invention, there is provided, for a pressure vessel having an opening in the wall thereof and an annular seat formed in the opening, a closure, or closure member, adapted to be disposed within the opening and adjacent to the seat. An annular resilient gasket is disposed between the closure and the seat, the configuration and composition of the gasket being adapted to seal the vessel against very high internal pressures, and at the same time to give with or conform to movement of the closure. To lock the closure within the vessel opening, the wall of the opening is provided with an annular recess which is located at a distance from the seat such that it is partially covered by the closure when the latter is inserted in the opening against the gasket. Means are provided for forcing the closure inwardly compressing or otherwise deforming the gasket to expose the recess, and a shear ring, preferably consisting of a number of ring-like segments, is disposed therein. The shear ring has a width which brings it out beyond the opening wall so that it bears against the upper surface of the closure holding the latter in place.

For moving the closure inwardly against the resistance of the gasket to expose the recess, there is provided a ring-like yoke having a first portion secured to the closure and a second portion adapted to be secured to the vessel. Preferably bolts are used for the latter purpose, and by drawing down and tightening on the bolts, the closure is moved into a position exposing the recess and permitting the shear ring to be inserted.

The yoke or yoke ring also functions to support a retaining ring, which is adapted or arranged to be disposed between the shear ring and an upstanding portion of the closure. In this way, the retaining ring holds the shear ring within its recess.

After the shear ring is positioned in the recessed area of the opening, the bolts for the yoke are backed off allowing the shear ring to take any force against the closure. The gasket, by virtue of its composition and configuration will correspondingly expand or conform to seal the opening.

Further in accordance with the invention, the bolts used to draw down on the yoke or yoke ring may be of the "jack screw" type capable of pulling the closure out of the opening in the event the closure, gasket and flange are frozen together.

It will become apparent that the arrangement of the invention provides a simplified and practical way of inserting and returning a closure within a vessel opening and at the same time sealing the opening so that the closure can withstand extremely high internal pressures within the vessel without leakage. In addition, the arrangement cooperates with a shear ring assembly in such a way that the shear blocks can be slipped easily into place when the gasket is precompressed, after which the shear blocks can be made to withstand the full force against the closure without loss of effective sealing by the gasket. Also, the arrangement provides for freeing the closure from the vessel should it be frozen within the opening. Further, the vessel may be opened and closed an indefinite number of times without replacement of the gasket.

Other advantages and a further understanding of the invention will become apparent upon consideration of the following detailed description, with reference to the accompanying drawing in which:

FIGURE 1 is a plan section view illustrating a closure arrangement in accordance with the invention;

FIGURE 2 is a section view illustrating the shear ring withdrawn from its locking position;

FIGURE 3 is a section view reduced in size and taken along line 3—3 of FIG. 1;

FIGURE 4 is a perspective view of a yoke ring in accordance with the invention; and FIGURE 5 is a perspective view reduced in size of a segment of a shear ring in accordance with the invention.

Referring to FIG. 1, there is illustrated a vessel 12 having an upstanding cylindrical flange portion 14 defining an opening 16 leading to the inside 18 of the vessel. The opening is provided with an annular seat 20 on which a gasket 22 is located. Within the opening 16, a closure or plug 24 is inserted having an inner annular rim portion 25 pressing against the gasket 22 and supported by the seat 20 of the vessel flange.

Near the outer rim of the flange and spaced from the seat 20, there is provided a continuous annular recessed area 26 into which a ring-shaped shear ring 28 is disposed, the shear ring extending inwardly into the vessel opening and bearing against the upper surface 30 of the closure. From FIG. 1, it is apparent that the shear ring prevents upward or outward movement of the closure member when the latter is subjected to high internal pressures within the vessel.

The shear ring preferably is in the form of a plurality of segments 32, illustrated in FIGS. 3 and 5, extending substantially the full circumference of the recess 26. By making the shear ring in segments, it can be inserted easily into the recessed area, and can provide a backing or support for substantially the full circumference of the closure.

The gasket 22 must be elastic and capable of deforming with or conforming to movement of the closure, but at the same time must be capable of sealing the vessel under high pressures despite said movement. Although many types of gaskets are suitable, a stainless steel gasket having a T cross-sectional configuration has been found to be extremely effective. The seat 20 of the vessel flange and the closure rim 25, the latter projecting towards the seat 20, are provided with opposed, inner, beveled edges or surfaces 36 and 38 respectively against which the lower and upper arms or lips 40 and 42 of the T shaped gasket bear. The perpendicular portion 44 of the T extends radially between the seat 20 and the rim 25 of the closure. In the normal or repose position of the closure, i.e., the position when the closure is simply inserted within the vessel opening, the arms 40 and 42 of the gasket bear against the beveled surfaces 36 and 38, in the manner shown in FIG. 1 and support the closure with its upper surface partially covering the recessed area 26 and the bottom rim slightly away from the portion 44 of the T and the latter slightly away from the seat 20. When the closure is forced inwardly, by means to be described, the arms are deflected towards the axis of the opening until the closure rim, gasket portion 44, and the seat are contiguous or in contact, as shown in FIG. 2. At this point the recess 26 is exposed for insertion of the shear ring 28. On return of the closure to its natural or repose position, and after insertion of the shear ring, the gasket arms follow the beveled surfaces of the seat and rim, remaining in sealing contact therewith. Of course, as the pressure in the vessel increases, the seal improves since the pressure forces a greater surface or area of the arms of the T gasket to bear against the beveled surfaces of the seat and closure rim.

The particular type of gasket shown is a commercial item. It is obvious that many other gaskets and sealing arrangements functioning in the same manner can be used; for instance, a U-shaped gasket, or one having X cross-sectional configuration. The material also can be varied. For instance, a quenched tempered steel can be used. The qualifications are only that the material be elastic and yet capable of withstanding the high pressures involved.

It should be apparent that the gasket by its elasticity permits the vessel to be opened and closed with precompression of the gasket an indefinite number of times without replacement of the gasket being required. For the purposes of this specification, the term "precompression" is a term in the art generic to any type of deforming of a resilient or an elastic gasket. Actually, with the type of gasket illustrated, there is little or no tangible compression. On the other hand with a U-shaped gasket or one having an X configuration, the gasket may be said to be compressible.

To precompress or deform the gasket 22, and to force the closure 24 inwardly within the flange 14 of the vessel, there is provided an annular yoke ring 46, FIGS. 1 and 4, having an upstanding annular first portion 48 attached to the upper surface of the closure member, by spaced lugs 50, and a second outwardly extending arm portion 52 adapted to be attached to the vessel flange 14. The lugs 50 are welded to the yoke ring, to downwardly extending legs 54, and are bolted to the upper surface of the closure member by bolts 56.

A plurality of spaced bolts 58 which are heavier than those used to hold the yoke ring to the closure member are used to secure the yoke ring to the vessel flange 14. Essentially, by drawing down or turning on the bolts 58, the yoke ring is brought downwardly, forcing the closure member 24 inwardly and exposing the annular recess 26. When so exposed, as in FIG. 2, the shear rings 32 can be positioned within the recess. For this latter purpose, the spacings between legs 54, FIG. 4, of the yoke ring permit access to the recessed area.

The yoke ring is also provided with bolt means 60 supporting a retaining ring 62 disposed between the shear ring segments 32 and an upstanding center portion or rim 64 of the closure. As illustrated in FIG. 2, the closure can be removed from the vessel opening by following the steps of first tightening on bolts 58 forcing the closure inwardly from its FIG. 1 position, drawing upwardly on the bolts 60 moving the retaining ring 62 out of place, and drawing the shear ring segments 32 towards the axis of the vessel opening. Then, the bolts 58 may be released, allowing the closure member to be drawn out of the vessel opening.

Although a plain bolt may be used to secure the yoke to the vessel flange, a "jack screw" type bolt may be used which when turned in a direction to release the tension on the bolt forces the yoke and hence closure member outwardly from the vessel opening. This type of bolt, illustrated in FIG. 2, wherein a snap ring, or ridge 66, on the bolt bears against a recessed area 68 in the yoke ring, is useful in the event the plug, gasket and flange become frozen.

Design considerations dictate the number of bolts 58 required to tighten down on the closure member. For instance, for an internal pressure within the vessel of approximately 10,000 pounds per square inch, and with a 30-inch diameter closure, a seal may be used designed to be compressed with approximately 110,000 pounds compression. Each bolt may be a 1-inch bolt designed to withstand a tension in the order of 20,000 pounds. Accordingly, approximately 8 bolts equally spaced around the yoke ring will be required.

Many variations will be apparent to those skilled in the art, but within the spirit and scope of the invention as defined in the following claims.

What is claimed is:

1. In a pressure vessel having an opening in a wall thereof, a seat formed in said opening, and an annual recess in the opening wall spaced at a distance from said seat; a closure member disposed within the opening and adjacent to said seat, an annular resilient gasket between said closure member and the seat adapted to seal said vessel, shear block means adapted to be disposed in said annular recess to lock the closure member in place within the vessel opening, the dimensions of the closure member being such that the member must be moved inwardly exposing the recess a distance sufficient for disposition of said shear blocks, said resilient gasket being subjected to precompression when the closure member is so moved; and yoke means adapted to move said closure member inwardly, said yoke means comprising an annular member having a first portion secured to the closure member, a second portion adapted to be secured to the vessel, and means for securing said second portion, which on tightening is further adapted to move said closure member inwardly to expose said recess.

2. A pressure vessel in accordance with claim 1 and further comprising means to hold said shear block means in position and within said recess.

3. A pressure vessel according to claim 2 wherein said last mentioned means comprises an upstanding rim portion on said closure and retaining members supported and held in place by said yoke means and positioned between said shear block means and said upstanding rim portion of the closure member.

4. In a pressure vessel having an opening in a wall thereof, a seat formed in said opening, and an annular recess in the opening wall spaced at a distance from said seat; a closure arrangement comprising a closure member disposed within the opening and adjacent to said seat, an annular resilient gasket between said closure member and the seat adapted to seal said vessel, the dimensions of the closure member being such that when positioned against said gasket it partially covers said recess, an annular ring-like yoke member having an upstanding first portion secured to said closure member and an outwardly extending second portion including means adapted to secure said second portion to said pressure vessel wall, said last-mentioned means being adapted to force the closure member against the gasket to compress the latter a distance sufficient to further expose said recess, a ring-shaped shear block adapted to be disposed in said recess when the gasket is so compressed and to lock the closure in place when compression of the gasket is relieved, and retaining means adapted to hold said shear block within said recess, said second portion further supporting and holding said retaining means.

5. In a pressure vessel having an opening in a wall thereof, a seat formed in said opening, and an annular recess in the opening wall spaced at a distance from said seat; a closure member disposed within the opening and adjacent to said seat, an annular resilient gasket between said closure mmeber and the seat adapted to seal said vessel, the dimensions of the closure member being such that when positioned against said gasket, it partially covers said recess, segments defining an anular ring-shaped shear block adapted to be disposed within the annular recess and to extend into the vessel opening a distance sufficient to overlap the upper surface of the closure member and to lock the closure member in place, a ring-shaped retaining member adapted to hold said shear block within said recess, an annular ring-like yoke member adapted to force said closure member inwardly within said vessel opening for compression of said gasket having an L-shaped cross sectional configuration comprising an annular upstanding first portion secured to the closure member and an outwardly extending second arm portion adapted to be secured to the vessel, and bolt means aligned with the axis of said vessel opening adapted to secure said arm portion to the vessel, which when tightened are further adapted to force said closure member inwardly in the vessel opening compressing the gasket, said yoke member being adapted to support said ring-shaped retaining member.

6. A pressure vessel in accordance with claim 5 wherein said last mentioned means is adapted to force said closure member outwardly from said vessel opening in the event the closure member, gasket and vessel become frozen.

7. A pressure vessel according to claim 5 wherein said gasket is a steel ring having a T-shaped cross section with the perpendicular portion of the T extending radially between the vessel opening seat and the closure member, said seat and closure member having inner beveled edge surfaces against which the outwardly extending arms of the T bear, holding the closure member upwardly in its natural repose position partially covering the recess, said arms deflecting and following said beveled surfaces with axial movement of said closure member.

References Cited in the file of this patent
UNITED STATES PATENTS
2,810,494    Smith _____ Oct. 22, 1957